(12) United States Patent
Chen et al.

(10) Patent No.: US 12,204,167 B2
(45) Date of Patent: Jan. 21, 2025

(54) OPTICAL LENS, CAMERA MODULE, AND ASSEMBLY METHOD FOR THE OPTICAL LENS

(71) Applicant: Ningbo Sunny Opotech Co., Ltd., Zhejiang (CN)

(72) Inventors: Liefeng Chen, Zhejiang (CN); Zhewen Mei, Zhejiang (CN); Takehiko Tanaka, Zhejiang (CN); Xinxiang Sun, Zhejiang (CN); Lin Liu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 764 days.

(21) Appl. No.: 17/426,878

(22) PCT Filed: Jan. 3, 2020

(86) PCT No.: PCT/CN2020/070206
§ 371 (c)(1),
(2) Date: Jul. 29, 2021

(87) PCT Pub. No.: WO2020/156027
PCT Pub. Date: Aug. 6, 2020

(65) Prior Publication Data
US 2022/0107480 A1    Apr. 7, 2022

(30) Foreign Application Priority Data

Feb. 3, 2019  (CN) .......................... 201910108672.7
Feb. 3, 2019  (CN) .......................... 201920187715.0

(51) Int. Cl.
*G02B 7/02*    (2021.01)
*G03B 17/12*   (2021.01)
*H04N 23/55*   (2023.01)

(52) U.S. Cl.
CPC ............. *G02B 7/025* (2013.01); *G02B 7/021* (2013.01); *G03B 17/12* (2013.01); *H04N 23/55* (2023.01)

(58) Field of Classification Search
CPC .......... G02B 7/02; G02B 7/021; G02B 7/022; G02B 7/023; G02B 7/025; G02B 7/026; G02B 7/027; G02B 7/028; H04N 23/55
See application file for complete search history.

(56) References Cited

U.S. PATENT DOCUMENTS

| | | | |
|---|---|---|---|
| 2017/0276897 A1* | 9/2017 | Nalla | B29C 65/16 |
| 2018/0224623 A1* | 8/2018 | Lin | G02B 7/021 |
| 2021/0271048 A1* | 9/2021 | Maesaka | G02B 7/025 |

FOREIGN PATENT DOCUMENTS

| | | | | |
|---|---|---|---|---|
| CN | 207249220 | | 4/2018 | |
| CN | 207249220 U | * | 4/2018 | ........... G02B 13/001 |

(Continued)

OTHER PUBLICATIONS

International Search Report issued Mar. 26, 2020 in International (PCT) Application No. PCT/CN2020/070206 with English translation.

(Continued)

*Primary Examiner* — Ephrem Z Mebrahtu
(74) *Attorney, Agent, or Firm* — Wenderoth, Lind & Ponack, L.L.P.

(57) ABSTRACT

The optical lenses include a first lenses part including a first lens and a second lenses part including a second lens. The second lens and the first lens constitute an imageable optical system. A first adhesive material is located in a first gap between the first and second lenses parts, the first adhesive material supporting and fixing the first and second lenses parts. The first lenses part has a first bottom surface, and the second lenses part has a second top surface. An adhesive applying area for arranging the first adhesive material is (Continued)

provided on the first bottom surface and/or the second top surface. A first adhesive blocking portion is provided on the first bottom surface and/or a third adhesive blocking portion is provided on the second top surface.

17 Claims, 5 Drawing Sheets

(56) References Cited

FOREIGN PATENT DOCUMENTS

| | | |
|---|---|---|
| CN | 207336891 | 5/2018 |
| CN | 208141014 | 11/2018 |
| CN | 208270827 | 12/2018 |
| CN | 208334747 | 1/2019 |
| CN | 208367291 | 1/2019 |
| CN | 208432778 | 1/2019 |
| CN | 209514178 | 10/2019 |
| EP | 2 881 774 | 6/2015 |
| EP | 2 933 670 | 10/2015 |
| EP | 3 355 113 | 8/2018 |
| JP | 2010-191345 | 9/2010 |
| JP | 2016-051076 | 4/2016 |
| KR | 10-2014-0076761 | 6/2014 |

OTHER PUBLICATIONS

Extended European Search Report issued Feb. 14, 2022 in corresponding European Application No. 20748593.9.

* cited by examiner

OPTICAL LENS, CAMERA MODULE, AND ASSEMBLY METHOD FOR THE OPTICAL LENS

CROSS-REFERENCES TO RELATED APPLICATIONS

This application claims the benefit of the priorities of Chinese invention patent application filed on Feb. 3, 2019 with application number of 201910108672.7 and title of "Optical Lenses, Camera Module and Assembly Method Thereof", and the Chinese utility model patent application filed on Feb. 3, 2019 with application number of 201920187715.0 and title of "Optical Lenses and Camera Module". The entire content of the above patent applications is incorporated herein by reference.

TECHNICAL FIELD

This application relates to the field of optical imaging technology, particularly, this application relates to an optical lenses, a camera module, and a method for assembling the optical lenses.

BACKGROUND ART

With the popularization of mobile electronic devices, the related technologies of camera modules used in mobile electronic devices to help users obtain images (such as videos or images) have been rapidly developed and advanced, and in recent years, camera modules have been widely used in many fields such as medical treatment, security and protection, industrial production and so on.

In the process of improving the imaging capability of the camera module, there are three main factors affecting the imaging quality: the first one is the imaging quality of the lenses, that is, a high-quality lenses may correct the aberrations of the optical system very well and achieve a higher imaging quality; the second one is the photosensitive ability of the photosensitive chip, and generally speaking, the larger the single pixel area of the photosensitive chip is, the stronger the photosensitive ability is; and the third one is ISP (image signal processor), i.e., the image processing algorithm, that is, different manufacturers have different algorithm capabilities and different image optimization capabilities, and after processing by different manufacturers, the final images will be quite different from even the hardware of same specification. Among the above factors, the quality of the lenses determines the imaging capability of the entire camera module. In order to obtain large-aperture lenses, large wide-angle lenses and telephoto lenses with high-quality, and higher-quality imaging, the lens number in the lenses designed by the manufacturer is increasing and it reaches six, seven, or even more. The increase of the lens number requires very high precision in lenses assembly, but due to the existence of assembly tolerance and part tolerance, the more the lens number is, the greater the tolerance of forming final lenses is, and it affects the imaging quality. At the same time, the sensitivity of large aperture and wide-angle lenses is also relatively high, and requires higher accuracy for assembling lenses. In short, due to the existence of part tolerance and assembly tolerance, the imaging quality and yield of the lenses are greatly affected.

In order to overcome the above difficulties, the present application provides a multi-group lenses that may adjust the imaging quality of the lenses by active calibration. When the part tolerance and assembly tolerance are within a certain range, the imaging quality of the lenses may be compensated by active calibration, and then multiple groups may be assembled and fixed by bonding with adhesive material, thereby forming the lenses with a perfect optical system.

However, when assembling the above lenses, it is necessary to bind and fix the upper and lower sub-lenses by adhesive material, and at the time of not being cured, the adhesive material is in liquid state and has fluidity. There is a time interval between the two processes of providing the adhesive material on the lenses parts and curing the adhesive material, so the adhesive material has a tendency to flow and spread to both sides in the adhesive applying area. At the same time, when the adhesive material is provided in the adhesive applying area, the adhesive material is generally in a shape of a ring with an oval cross-section, and there is a small gap between the upper and lower sub-lenses after adjusting by the active calibration, so that the adhesive material is squeezed to spread to the inside and outside of the lenses. The adhesive material diffusing to the outside affects aesthetics, and it also overflows and affects the motor or other parts, thereby affecting the overall performance and reliability of the module. The adhesive material diffusing to the inside flows into the undesired adhesion position inside the lenses, thereby affecting the performance and reliability of the lenses; and it is also easy to access to the adhesive material between the lens barrel and the lens of the sub-lenses, and since the composition and performance of the two adhesive materials are different, the overall performance and reliability of the two adhesive materials will be affected.

Contents of the Invention

This application provides a solution for overcoming at least one defect of the prior art.

According to one aspect of the present application, provided is an optical lenses, which includes: a first lenses part including at least one first lens; a second lenses part including at least one second lens, and at least one second lens together with at least one first lens constitute an imaging optical system; and a first adhesive material located in a first gap between the first lenses part and the second lenses part, and the first adhesive material is adapted for supporting and fixing the first lenses part and the second lenses part after being cured; wherein the first lenses part has a first bottom surface, and the second lenses part has a second top surface, and an adhesive applying area for arranging the first adhesive material is provided on the first bottom surface and/or the second top surface; and a first adhesive blocking portion is provided on the first bottom surface, and/or a third adhesive blocking portion is provided on the second top surface.

In one embodiment, the first lenses part further includes a first lens barrel, and the at least one first lens is mounted in the first lens barrel; and the second lenses part also includes a second lens barrel, and the at least one second lens is mounted in the second lens barrel; wherein the first lens barrel has a first bottom surface, and the second lens barrel has a second top surface, and an adhesive applying area for arranging the first adhesive material is provided on the first bottom surface and/or the second top surface; and wherein the at least one first lens has a first optical region, and the at least one second lens has a second optical region, and the first adhesive blocking portion is located between the adhesive applying area and the first optical region; and/or the third adhesive blocking portion is located between the adhesive applying area and the second optical region.

In one embodiment, the at least one first lens includes a first optical region and a first non-optical region, and the first non-optical region is arranged outside the first optical region, and the second lenses part further includes a second lens barrel, and the at least one second lens is mounted inside the second lens barrel; the first non-optical region has a first bottom surface, and the second lens barrel has a second top surface, and an adhesive applying area for arranging the first adhesive material is provided on the first bottom surface and/or the second top surface; and wherein the at least one second lens has a second optical region, and the first adhesive blocking portion is located between the adhesive applying area and the first optical region; and/or the third adhesive blocking portion is located between the adhesive applying area and the second optical region.

In one embodiment, the at least one first lens has an outer side surface, and the first lens barrel has a first inner side surface; wherein the outer side surface of the at least one first lens and the first inner side surface of the first lens barrel are connected by a second adhesive material. In one embodiment, the at least one first lens is more than one, and the outer side surface of the lens near the first bottom surface of the at least one first lens is connected with the first inner side surface by the second adhesive material.

In one embodiment, the first adhesive blocking portion is a groove or a boss, and the third adhesive blocking portion is a groove or a boss.

In one embodiment, the first adhesive blocking portion is a groove, and the width of the first adhesive blocking portion is 0.01-0.3 mm, and the depth of the first adhesive blocking portion is 0.02-0.1 mm.

In one embodiment, the first adhesive blocking portion is a boss, and the width of the first adhesive blocking portion is 0.01-0.3 mm, and the height of the first adhesive blocking portion is 0.02-0.1 mm.

In one embodiment, the third adhesive blocking portion is a groove, and the width of the third adhesive blocking portion is 0.2-1 mm, and the depth of the third adhesive blocking portion is 0.02-0.085 mm.

In one embodiment, the third adhesive blocking portion is a boss, and the width of the third adhesive blocking portion is 0.2-1 mm, and the height of the third adhesive blocking portion is 0.02-0.085 mm.

In one embodiment, after being cured, the width of the first adhesive material is 0.15-1 mm, and the height of the first adhesive material is 0.04-0.1 mm.

In one embodiment, a first adhesive blocking portion is provided on the first bottom surface, and the first adhesive blocking portion is located between the adhesive applying area and the first optical region, and the first adhesive blocking portion includes a distal end away from the at least one first lens, and the first lens barrel has a first outer side surface, and the distance between the distal end of the first adhesive blocking portion and the first outer side surface is greater than or equal to 0.35 mm.

In one embodiment, a third adhesive blocking portion is provided on the second top surface, and the third adhesive blocking portion is located between the adhesive applying area and the second optical region, and the third adhesive blocking portion includes a distal end away from the at least one second lens, and the second lens barrel has a second outer side surface, and the distance between the distal end of the third adhesive blocking portion and the second outer side surface is greater than or equal to 0.45 mm.

In one embodiment, the first lens barrel has a first outer side surface, and a second adhesive blocking portion is provided between the first outer side surface and the adhesive applying area, and the second adhesive blocking portion is located on the first bottom surface.

In one embodiment, the second lens barrel has a second outer side surface, and a fourth adhesive blocking portion is provided between the second outer side surface and the adhesive applying area, and the fourth adhesive blocking portion is located on the second top surface.

In one embodiment, the first adhesive material is distributed on the first bottom surface and/or the second top surface in a ring shape.

In one embodiment, the first adhesive blocking portion is distributed on the first bottom surface in a ring shape.

In one embodiment, the third adhesive blocking portion is distributed on the second top surface in a ring shape.

In one embodiment, the second lens barrel has a second outer side surface, and the first adhesive material is in contact with the second outer side surface of the second lens barrel and is not in contact with the third adhesive blocking portion.

In one embodiment, the second lens barrel has a second outer side surface, and the first adhesive material is in contact with the second outer side surface of the second lens barrel and is in contact with the third adhesive blocking portion.

In one embodiment, the second lens barrel has a second outer side surface, and the first adhesive material is not in contact with the second outer side surface of the second lens barrel and is not in contact with the third adhesive blocking portion.

In one embodiment, a first adhesive blocking portion is provided on the first bottom surface, and the first adhesive blocking portion is located between the adhesive applying area and the first optical region; and a third adhesive blocking portion is provided on the second top surface, and the third adhesive blocking portion is located between the adhesive applying area and the second optical region;
wherein the first adhesive blocking portion includes a proximal end adjacent to the at least one first lens and a distal end away from the at least one first lens, and the third adhesive blocking portion includes a proximal end adjacent to the at least one second lens and a distal end away from the at least one second lens; and
wherein the distal end of the third adhesive blocking portion is located between the proximal end and the distal end of the first adhesive blocking portion.

In one embodiment, the at least one first lens has a first structure area having a top surface with an arc-shaped structure, the first lens barrel has a first inner bottom surface having an arc-shaped surface that matches with the top surface of the first structure area with the arc-shaped structure.

According to one aspect of the present application, also provided is a camera module which includes any of the above optical lenses.

According to one aspect of the present application, also provided is a method for assembling an optical lenses, which includes: assembling separated first lenses part and second lenses part together to form a complete optical system; and connecting the first lenses part with the second lenses part by a first adhesive material; wherein the first lenses part has a first bottom surface, and the second lenses part has a second top surface, and a first adhesive blocking portion is provided on the first bottom surface, and/or a second adhesive blocking portion is provided on the second top surface.

In one embodiment, the first lenses part includes a first lens barrel and at least one first lens mounted in the first lens barrel, and the second lenses part includes a second lens barrel and at least one second lens mounted in the second lens barrel; and prior to assembling the separated first lenses part and second lenses part together to form a complete optical system, the assembly method further includes: connecting the first lens barrel with the at least one first lens by a second adhesive material.

In one embodiment, the second lenses part includes a second lens barrel and at least one second lens mounted in the second lens barrel, and prior to assembling the separated first lenses part and second lenses part together to form a complete optical system, the assembly method further includes: assembling the second lens barrel and the at least one second lens together.

In one embodiment, the first lenses part includes at least one first lens, and the second lenses part includes at least one second lens, wherein the step of assembling the separated first lenses part and second lenses part together to form a complete optical system includes: pre-positioning the first lenses part and the second lenses part, so that the at least one first lens together with the at least one second lens constitute an imaging optical system; and performing an active calibration according to a measured imaging result of the optical system, so as to determine relative positions of the first lenses part and the second lenses part.

In one embodiment, the first lenses part includes a first lens barrel and at least one first lens mounted in the first lens barrel, and the first lens barrel has a first bottom surface, and the second lenses part includes a second lens barrel and at least one second lens mounted in the second lens barrel, and the second lens barrel has a second top surface, and an adhesive applying area for arranging the first adhesive material is provided on the first bottom surface and/or the second top surface, and wherein the at least one first lens has a first optical region, and the at least one second lens has a second optical region, and a first adhesive blocking portion is provided on the first bottom surface, and the first adhesive blocking portion is located between the adhesive applying area and the first optical region; and/or a third adhesive blocking portion is provided on the second top surface, and the third adhesive blocking portion is located between the adhesive applying area and the second optical region.

In one embodiment, the step of determining the relative positions of the first lenses part and the second lenses part includes: arranging the first adhesive material in the adhesive applying area; and performing the active calibration according to the measured imaging result of the optical system, so as to determine the relative positions of the first lenses part and the second lenses part.

In one embodiment, the adhesive applying area is located on the first bottom surface; wherein the step of arranging the first adhesive material in the adhesive applying area includes: arranging the first adhesive material in the adhesive applying area on the first bottom surface.

In one embodiment, the adhesive applying area is located on the second top surface; wherein the step of arranging the first adhesive material in the adhesive applying area includes: arranging the first adhesive material in the adhesive applying area on the second top surface.

In one embodiment, the step of determining the relative positions of the first lenses part and the second lenses part includes: performing the active calibration according to the measured imaging result of the optical system, so as to determine the relative positions of the first lenses part and the second lenses part; moving away the first lenses part or the second lenses part; arranging the first adhesive material in the adhesive applying area; and moving the first lenses part or the second lenses part back to the relative position determined by the active calibration.

In one embodiment, the adhesive applying area is located on the first bottom surface; wherein the step of arranging the first adhesive material in the adhesive applying area includes: arranging the first adhesive material in the adhesive applying area on the first bottom surface.

In one embodiment, the adhesive applying area is located on the second top surface; wherein the step of arranging the first adhesive material in the adhesive applying area includes: arranging the first adhesive material in the adhesive applying area on the second top surface.

Compared with the prior art, this application has at least one of the following technical effects:

1. In the present application, the first adhesive blocking portion is arranged between the adhesive applying area and the first optical region, and/or the third adhesive blocking portion is arranged between the adhesive applying area and the second optical region, wherein the first adhesive blocking portion may effectively prevent the second adhesive material from overflowing to the outside of the lenses, and at the same time, it may also prevent the first adhesive material from flowing into the inside of the lenses; and the third adhesive blocking portion may effectively prevent the first adhesive material from flowing into the inside of the lenses. This application can prevent the first adhesive material from affecting the lenses, and avoiding the contact between the first adhesive material and the second adhesive material, so as to avoid affecting the performance and reliability of the two adhesive materials due to the difference in composition and performance between the two adhesive materials.

2. In one embodiment, the distal end of the third adhesive blocking portion is located between the proximal end and the distal end of the first adhesive blocking portion, and during the flow of the first adhesive material toward the first lens and the second lens, the first adhesive blocking portion and the third adhesive blocking portion may simultaneously block the first adhesive material, and form an adhesive blocking structure similar to "relay", which brings a better effect on blocking the adhesive and may effectively prevent the first adhesive material from contaminating the first lens and the second lens; alternatively, in case that the first lens barrel and the first lens are connected by the second adhesive material, the first adhesive material and the second adhesive material are prevented from contacting with each other, so as to avoid affecting the performance and reliability of these two adhesive materials.

BRIEF DESCRIPTION OF THE DRAWINGS

Exemplary examples are shown in the accompanying drawings for reference. The examples and drawings disclosed herein should be regarded as illustrative rather than restrictive ones.

SPECIFIC EMBODIMENTS

Figure 1:
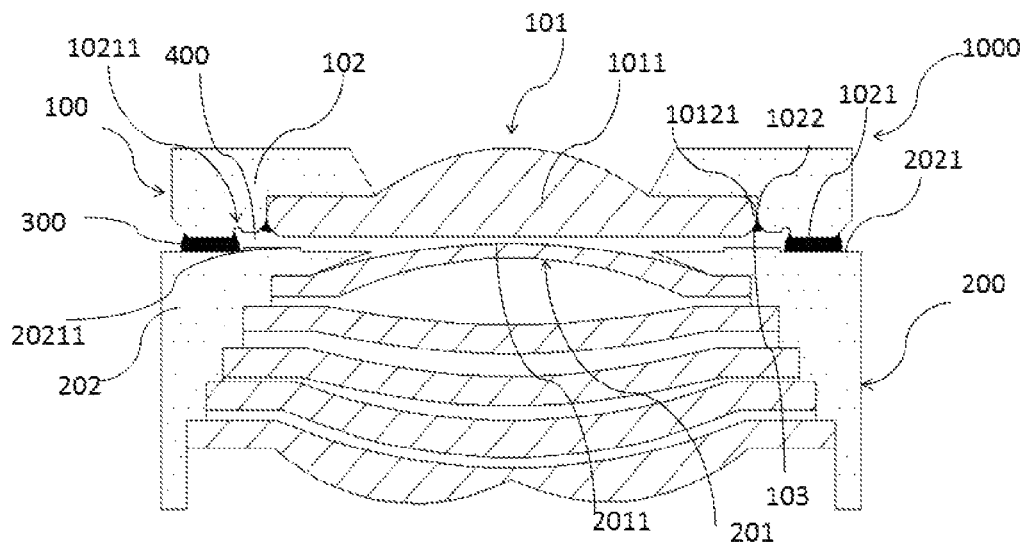
FIG. 1 shows a schematic cross-section view of an optical lenses according to an embodiment of the present application.

In order to better understand the application, various aspects of the application will be described in more detail with reference to the accompanying drawings. It should be understood that, these detailed descriptions are only descriptions of exemplary embodiments of the present application, and are not intended to limit the scope of the present application in any way. Throughout the specification, the same reference numerals in the drawings refer to the same elements. The expression "and/or" includes any and all combinations of one or more of the associated items being listed.

It should be noted that in this specification, expressions such as first, second, etc. are only used to distinguish one feature from another feature, and do not represent any restriction on the feature. Therefore, without departing from the teachings of the present application, the first subject discussed below may also be referred to as the second subject.

In the drawings, the thickness, size, and shape of objects have been slightly exaggerated for sake of illustration. The drawings are only examples and are not drawn strictly to scale.

It should also be understood that, the terms "including", "include", "having/containing", "including" and/or "include", when used in this specification, mean that the stated features, integers, steps, operations, components, parts and/or the combinations thereof are present, but do not exclude the presence or addition of one or more other features, integers, steps, operations, components, parts and/ or combinations thereof. In addition, when the expression such as "at least one of . . . " appears before the list of listed features, it modifies the entire listed features instead of modifying the individual components in the list. In addition, when describing the embodiments of the present application, as used herein, "may" means "one or more embodiments of the present application". Also, the term "exemplary" refers to an example or illustration.

As used herein, the terms "substantially", "approximately" and similar terms are used as terms representing approximation, not as terms representing degree, and are used to describe the inherent deviation in the measured value or calculated value that will be recognized by those of ordinary skill in the art.

Unless otherwise defined, all terms (including technical terms and scientific terms) used herein have the same meanings as commonly understood by those of ordinary skill in the art to which this application belongs. It should also be understood that, terms (such as those defined in commonly used dictionaries) should be interpreted as having meanings consistent with their meanings in the context of related technologies, and will not be interpreted in an idealized or excessively formal sense unless it is clearly defined in this disclosure.

It should be noted that, the examples in this application and the features in the examples may be combined with each other if there is no conflict. Hereinafter, the present application will be described in detail with reference to the drawings and in conjunction with the examples.

FIG. 1 shows a schematic cross-section view of an optical lenses according to an embodiment of the present application, and the cross-section is a cross-section passing through the optical axis of the optical lenses. In this embodiment, the optical lenses 1000 includes a first lenses part 100, a second lenses part 200, and a first adhesive material 300. The first lenses part 100 includes a first lens barrel 102 and a first lens 101 mounted in the first lens barrel 102, and the first lens barrel 102 and the first lens 101 is connected by a second adhesive material 103 optionally. In other embodiments, the first lens barrel 102 and the first lens 101 may be connected by interference fit or snap fit optionally, instead of using an adhesive such as the second adhesive material 103 for connection. When the first lens barrel 102 and the first lens 101 is optionally connected by a second adhesive material 103, at least one first lens 101 has an outer side surface 10121, and the first lens barrel 102 has a first inner side surface 1022, and at least one first lens 101 and the first lens barrel 102 are connected by the second adhesive material 103, and the second adhesive material 103 connects the outer side surface 10121 of at least one first lens 101 and the first inner side surface 1022 of the first lens barrel 102. In one example, the first lens barrel 102 and the first lens 101 are optionally connected by interference fit or snap fit, and at the same time, the second adhesive material 103 is used to connect the outer side surface 10121 of the at least one first lens 101 and the inner side surface 1022 of the first lens barrel 102, thereby strengthening the connection to increase the strength. In yet another example (not the example shown in FIG. 1, but the position of the feature in FIG. 1 may be referred to), the first lens barrel 102 has a first bottom surface 1021, and in case that the number of at least one first lens 101 is more than one, the outer side surface 10121 of the lens close to the first bottom surface 1021 among the at least one first lens 101 and the first inner side surface 1022 of the first lens barrel 102 are connected by the second adhesive material 103, i.e., in case that the number of the first lens 101 is more than one, the outer side surface of the first lens 101 closest to the first bottom surface 1021 of the first lens barrel 102 and the first inner surface 1022 of the first lens barrel 102 is connected by the second adhesive material 103.

Still referring to FIG. 1, the second lenses part 200 includes a second lens barrel 202 and at least one second lens 201 mounted in the second lens barrel 202, and the at least one second lens 201 together with the first lens 101 constitute an imaging optical system. The number of at least one second lens 201 in FIG. 1 is 5, and this is only exemplary and not limiting. In other examples, the number of at least one second lens 201 may be 6, 7 or more. The first adhesive material 300 is located in a first gap 400 between the first lenses part 100 and the second lenses part 200, and after being cured, the first adhesive material 300 is adapted for supporting and fixing the first lenses part 100 and the second lenses part 200. The first lens barrel 102 has a first bottom surface 1021, and the second lens barrel 202 has a second top surface 2021, and an adhesive applying area for arranging the first adhesive material 300 is provided on the first bottom surface 1021 and/or the second top surface 2021. The adhesive applying area may be located on the first bottom surface 1021 or the second top surface 2021, alternatively, the adhesive applying area may be located on both of the first bottom surface 1021 and the second top surface 2021 at the same time. Among them, since the first adhesive material 300 has fluidity, the adhesive applying area is an initial area for arranging the first adhesive material, but not the final position area of the first adhesive material 300 shown in FIG. 1. As shown in FIG. 1, at least one first lens 101 has an optical region 1011, and at least one second lens 201 also has an optical region 2011. The first bottom surface 1021 has a first adhesive blocking portion 10211, and the first adhesive blocking portion 10211 is located between the adhesive applying area and the optical region 1011 of the at least one first lens 101. The second top surface 2021 has a third adhesive blocking portion 20211, and the third adhesive blocking portion 20211 is located between the adhesive applying area and the optical region 2011 of the at least one second lens 201. In the example shown in FIG. 1, there are both of the first adhesive blocking portion 10211 and the third adhesive blocking portion 20211. In other examples, it may only have any one of the first adhesive blocking portion 10211 and the third adhesive blocking portion 20211.

Referring to FIG. 1, the first adhesive blocking portion 10211 is a groove, and the third adhesive blocking portion 20211 is a boss. In other embodiments, the first adhesive blocking portion 10211 may also be a boss, and the third adhesive blocking portion 20211 may be a groove; alternatively, both the first adhesive blocking portion 10211 and the third adhesive blocking portion 20211 may be grooves at the same time, or may be bosses at the same time. In FIG. 1, the optical lenses 1000 has both of the first adhesive blocking portion 10211 and the third adhesive blocking portion 20211; and in other examples, it may have only one of the first adhesive blocking portion 10211 or the third adhesive blocking portion 20211.

In one example, the first adhesive material 300 is distributed on the first bottom surface 1021 and/or the first top surface 2021 in a ring shape. In one example, the first adhesive blocking portion 10211 is distributed on the first bottom surface 1021 in a ring shape. In one example, the third adhesive blocking portions 20211 is distributed on the first top surface 2021 in a ring shape.

In the above embodiment, the limitation of the first adhesive material 300 may be realized by arranging the first adhesive blocking portion 10211 between the adhesive applying area and the optical region 1011 of the first lens 101 and arranging the third adhesive blocking portion 20211 between the adhesive applying area and the optical region 2011 of the second lens 201, so as to prevent the first adhesive material 300 from contaminating the first lens 101 or the second lens 201 through the first gap 400. Alternatively, in case that the first lens barrel 102 and the first lens 101 is connected by the second adhesive material 103, the first adhesive material 300 and the second adhesive material 103 are prevented from contacting with each other, so as to avoid affecting the performance and reliability of the first adhesive material 300 and the second adhesive material 103. Herein, in case that the first lens barrel 102 and the first lens 101 is connected by the second adhesive material 103, the first adhesive blocking portion 10211 may effectively prevent the second adhesive material 103 from overflowing to the outside of the lenses, and at the same time may prevent the first adhesive material 300 from flowing to the inside of the lenses, thereby effectively preventing the first adhesive material 300 and the second adhesive material 103 from contacting with each other.

In one example, the first lenses part does not include the first lens barrel, but includes at least one first lens, and the at least one first lens includes an optical region and a non-optical region, wherein the non-optical region is arranged outside the optical region. The non-optical region of the at least one first lens has a first bottom surface which includes an adhesive applying area for arranging the first adhesive material. The first adhesive blocking portion is located between the adhesive applying area and the optical region of the at least one first lens.

Figure 2:
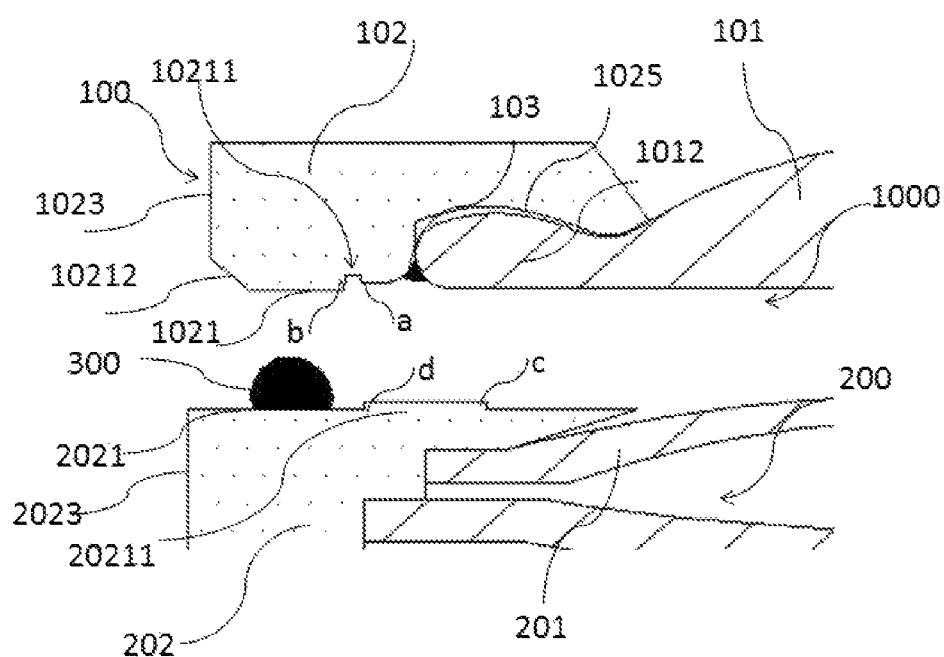
FIG. 2 shows a schematic partial cross-section view of the optical lenses in the embodiment of FIG. 1, in which a first lenses part and a second lenses part are separated.

FIG. 2 shows a schematic partial cross-section view of the optical lenses 1000 of the embodiment of FIG. 1, in which the first lenses part 100 and the second lenses part 200 are separated. Referring to FIG. 2, the first lenses part 100 and the second lenses part 200 are in a separated state, and the first adhesive blocking portion 10211 is a groove, and the third adhesive blocking portion 20211 is a boss. In FIG. 2, the first adhesive blocking portion 10211 is a groove, and the width of the first adhesive blocking portion 10211 is 0.01-0.3 mm, and the depth of the first adhesive blocking portion 10211 is 0.02-0.1 mm. The third adhesive blocking portion 20211 is a boss, and the width of the third adhesive blocking portion 20211 is 0.2-1 mm, and the height of the third adhesive blocking portion 20211 is 0.02-0.085 mm.

In other examples, the third adhesive blocking portion may optionally be a groove, and the width of the third adhesive blocking portion is 0.2-1 mm, and the depth of the third adhesive blocking portion is 0.02-0.085 mm.

In other examples, the first adhesive blocking portion is a boss, and the width of the first adhesive blocking portion is 0.01-0.3 mm, and the height of the first adhesive blocking portion is 0.02-0.1 mm.

Referring to FIG. 1, after the first adhesive material 300 between the first lenses part 100 and the second lenses part 200 is cured, the width of the first adhesive material 300 is 0.15-1 mm, preferably greater than or equal to 0.3 mm and less than or equal to 1 mm, and the height of the first adhesive material 300 is 0.04-0.1 mm.

Referring to FIG. 2, the distance from the distal end d of the third adhesive blocking portion 20211 to the second outer side surface 2023 of the second lens barrel 200 is greater than or equal to 0.45 mm.

Referring to FIG. 2, the distance from the distal end b of the first adhesive blocking portion 10211 to the first outer side surface 1023 of the first lens barrel 100 is greater than or equal to 0.35 mm.

Still referring to FIG. 2, the first adhesive blocking portion 10211 is provided on the first bottom surface 1021, and the first adhesive blocking portion 10211 is located between the adhesive applying area (since the first adhesive material 300 in FIG. 2 is not squeezed and deformed, the position of the first adhesive material 300 in FIG. 2 may be the adhesive applying area, i.e., the adhesive applying area is located at the position of the first adhesive material 300 in FIG. 2) and the optical region of the at least one first lens 101. The third adhesive blocking portion 20211 is provided on the second top surface 2021, and the third adhesive blocking portion 20211 is located between the adhesive applying area and the optical region of the at least one second lens 201. Herein, the first adhesive blocking portion 10211 includes a proximal end a adjacent to the at least one first lens 101 and a distal end b away from the at least one first lens 101, and the third adhesive blocking portion 20211 includes a proximal end c adjacent to the at least one second lens 201 and a distal end d away from the at least one second lens 201; and wherein the distal end d of the third adhesive blocking portion 20211 is located between the proximal end a and the distal end b of the first adhesive blocking portion 10211.

In the embodiment shown in FIG. 2, the distal end d of the third adhesive blocking portion 20211 is located between the proximal end a and the distal end b of the first adhesive blocking portion 10211; and during the flow of the first adhesive material 300 toward the first lens 101 and the second lens 201, the first adhesive blocking portion 10211 and the third adhesive blocking portion 20211 may simultaneously block the first adhesive material 300, and form a blocking structure similar to a "relay", which brings a better effect on blocking the adhesive and may effectively prevent the first adhesive material 300 from contaminating the first lens 101 or the second lens 201; alternatively, in case that the first lens barrel 102 and the first lens 101 are connected by the second adhesive material 103, the first adhesive material 300 and the second adhesive material 103 are prevented from contacting with each other, so as to avoid affecting the performance and reliability of the first adhesive material 300 and the second adhesive material 103.

Figure 3:
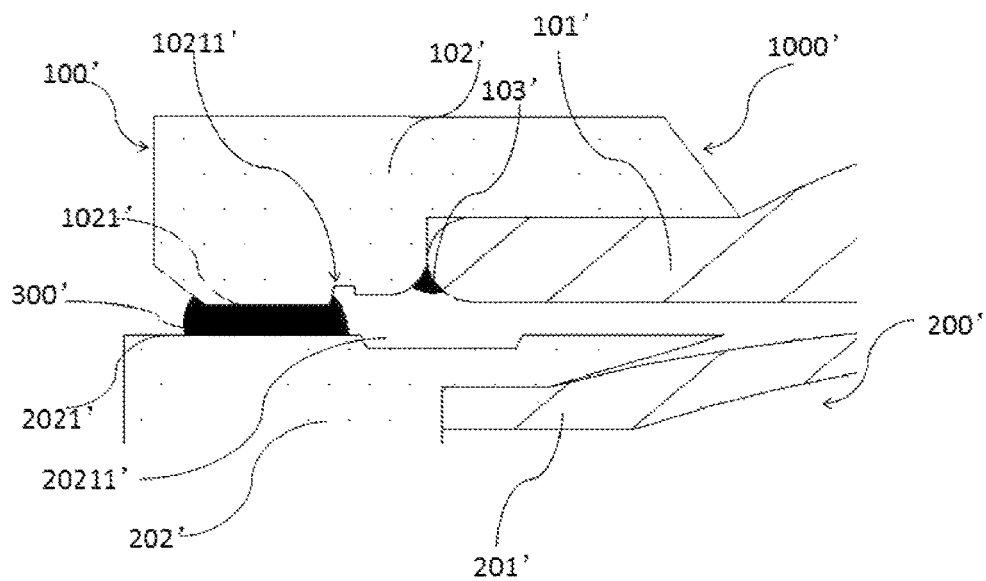
FIG. 3 shows a schematic partial cross-section view of the optical lenses according to an embodiment of the present application.

FIG. 3 shows a schematic partial cross-section view of an optical lenses 1000' according to an embodiment of the present application. Referring to FIG. 3, a first adhesive blocking portion 10211' is a groove, and a third adhesive blocking portion 20211' is also a groove.

Still referring to FIG. 3, a first adhesive blocking portion 10211' is provided on a first bottom surface 1021', and the first adhesive blocking portion 10211' is located between an adhesive applying area and an optical region of at least one first lens 101'; a third adhesive blocking portion 20211' is provided on a second top surface 2021', and the third adhesive blocking portion 20211' is located between an adhesive applying area and an optical region of at least one second lens 201'; wherein the first adhesive blocking portion 10211' includes a proximal end adjacent to the at least one first lens 101' and a distal end away from the at least one first lens 101', and the third adhesive blocking portion 20211' includes a proximal end adjacent to the at least one second lens 201' and a distal end away from the at least one second lens 201'; and the distal end of the third adhesive blocking portion 20211' is located between the proximal end and the distal end of the first adhesive blocking portion 10211'.

In the embodiment shown in FIG. 3, the distal end of the third adhesive blocking portion 20211' is located between the proximal end and the distal end of the first adhesive blocking portion 10211', and both of the first adhesive blocking portion 10211' and the third adhesive blocking portion 20211' are groove structures, which may simultaneously absorb the first adhesive material 300' through the absorbing effect of the groove, and form an adhesive blocking structure similar to "relay", so that during the flow of the first adhesive material 300' toward the first lens 101' and the second lens 201', the first adhesive blocking portion 10211' and the third adhesive blocking portion 20211' may simultaneously block the first adhesive material 300', which brings a better effect on blocking the adhesive and may effectively avoid the first adhesive material 300' from contaminating the first lens 101' or the second lens 201'. Alternatively, in case that the first lens barrel 102' and the first lens 101' is connected by a second adhesive material 103', the first adhesive material 300' and the second adhesive material 103' are prevented from contacting with each other, so as to avoid affecting the performance and reliability of the first adhesive material 300' and the second adhesive material 103'.

Referring to FIG. 2, the first lens barrel 102 has a first outer side surface 1023, and a second adhesive blocking portion 10212 is provided between the first outer side surface 1023 and the adhesive applying area, and the second adhesive blocking portion 10212 is located on the first bottom surface 1021. Herein, in FIG. 2, the second adhesive blocking portion 10212 is a chamfered structure. In other examples, the second adhesive blocking portion 10212 may optionally be a groove or a boss structure. Although not shown, a fourth adhesive blocking portion may optionally be provided between the second outer side surface 2023 of the second lens barrel 202 and the adhesive applying area, and the fourth adhesive blocking portion may be a groove or a boss structure. By providing the third adhesive blocking portion or the fourth adhesive blocking portion, or both of the third adhesive blocking portion and the fourth adhesive blocking portion at the same time, the first adhesive material 300 may be effectively prevented from flowing to the outer side surface of the optical lenses 1000.

Referring to FIG. 2, the first lens 101 has a first structure area 1012 with an arc-shaped top surface, and the first lens barrel 102 has a first inner bottom surface 1025 with an arc-shaped surface that matches with the arc-shaped structure of a first structure area 1011. The arc-shaped matching structures of the first structure area 1011 of the first lens 101 and the first inner bottom surface 1025 of the first lens barrel 102 may reduce the assembly gap, thereby reducing the generation of stray light, and improving the imaging quality of the lenses.

Figure 4A:
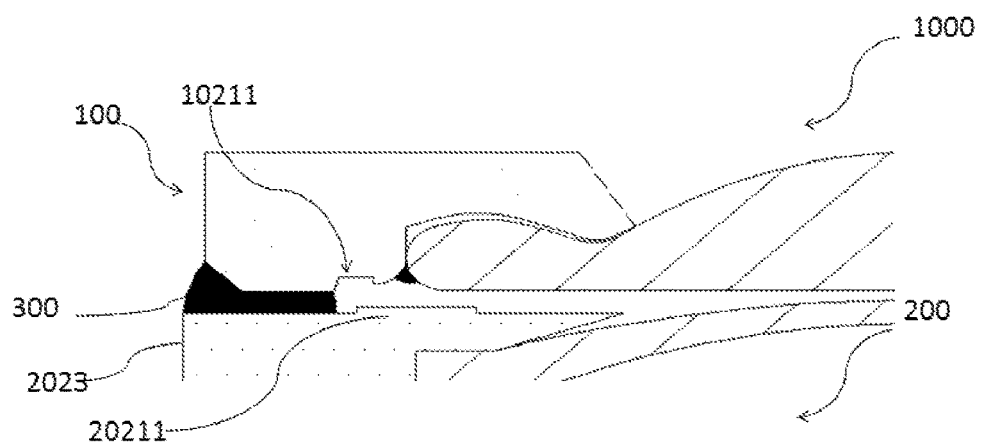
FIG. 4A shows a schematic partial cross-section view of the optical lenses according to an embodiment of the present application.

FIG. 4A shows a schematic partial cross-section view of the optical lenses 1000 according to an embodiment of the present application. As shown in FIG. 4A, the third adhesive blocking portion 20211 is a boss, and the first adhesive material 300 is in contact with the second outer side surface 2023 of the second lens barrel 200, and is not in contact with the third adhesive blocking portion 20211 at the same time.

Figure 4B:
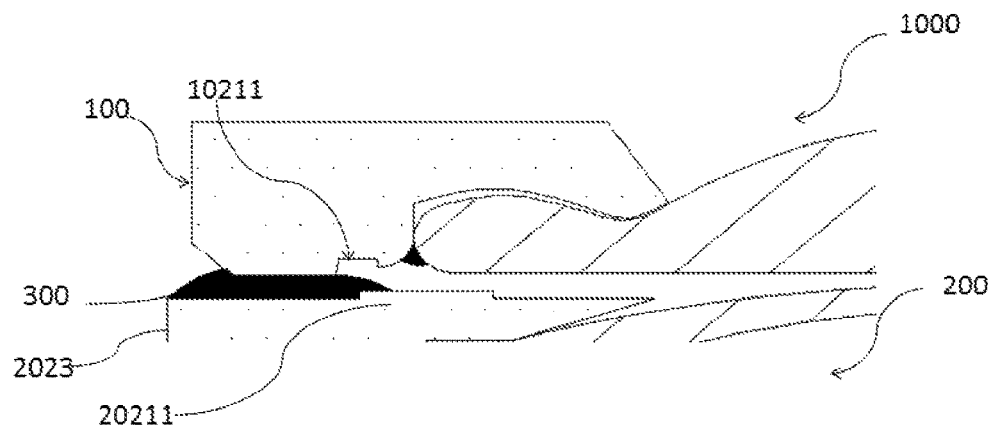
FIG. 4B shows a schematic partial cross-section view of the optical lenses according to an embodiment of the present application.

FIG. 4B shows a schematic partial cross-section view of the optical lenses 1000 according to an embodiment of the present application. As shown in FIG. 4B, the third adhesive blocking portion 20111 is a boss, and the first adhesive material 300 is in contact with the second outer side surface 2023 of the second lens barrel 200, and is in contact with the third adhesive blocking portion 20111 at the same time.

Figure 4C:
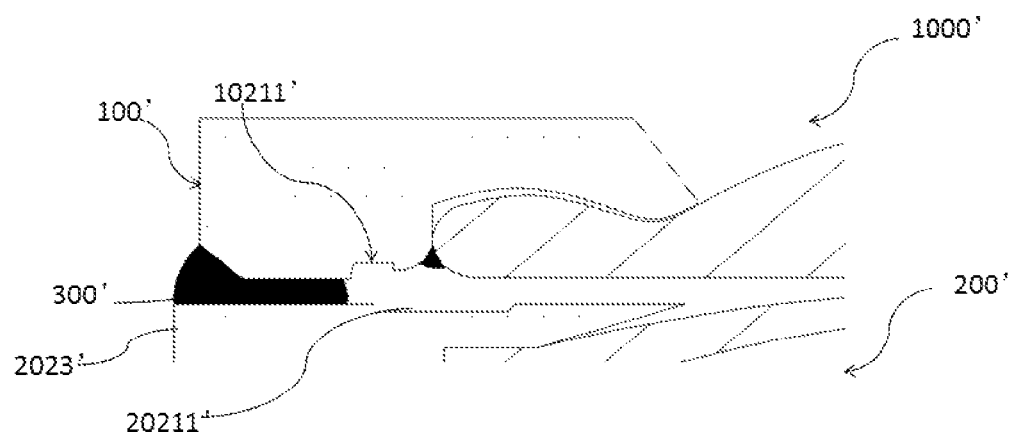
FIG. 4C shows a schematic partial cross-section view of the optical lenses according to an embodiment of the present application.

FIG. 4C shows a schematic partial cross-section view of the optical lenses 1000' according to an embodiment of the present application. As shown in FIG. 4C, the third adhesive blocking portion 20211' is a groove, and the first adhesive material 300' is in contact with the second outer side surface 2023' of the second lens barrel 200', and is not in contact with the third adhesive blocking portion 20211' at the same time.

Figure 4D:
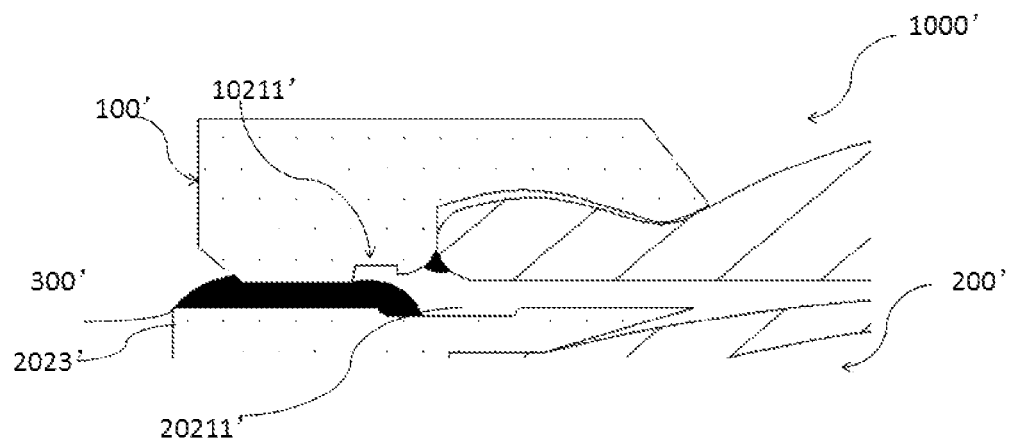
FIG. 4D shows a schematic partial cross-section view of the optical lenses according to an embodiment of the present application.

FIG. 4D shows a schematic partial cross-section view of the optical lenses 1000' according to an embodiment of the present application. As shown in FIG. 4D, the third adhesive blocking portion 20211' is a groove, and the first adhesive material 300' is in contact with the second outer side surface 2023' of the second lens barrel 200', and is in contact with the third adhesive blocking portion 20211' at the same time.

Figure 4E:
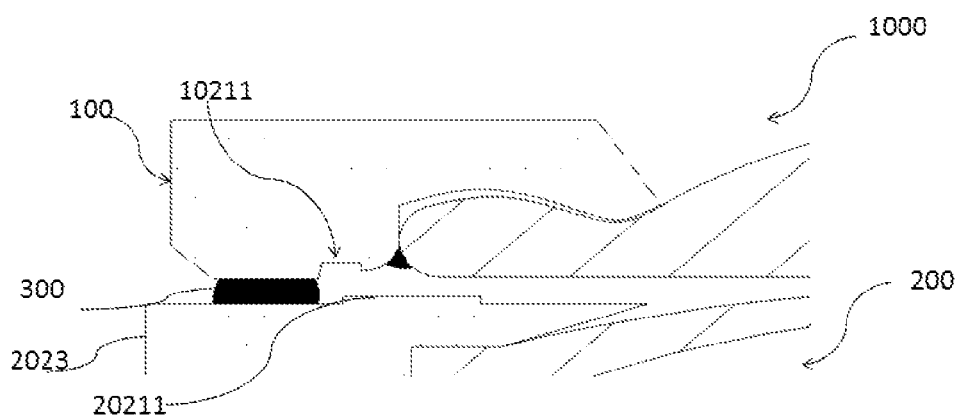
FIG. 4E shows a schematic partial cross-section view of the optical lenses according to an embodiment of the present application.

FIG. 4E shows a schematic partial cross-section view of the optical lenses 1000 according to an embodiment of the present application. As shown in FIG. 4E, the third adhesive blocking portion 20211 is a boss, and the first adhesive material 300 is not in contact with the second outer side surface 2023 of the second lens barrel 200, and is not in contact with the third adhesive blocking portion 20111 at the same time.

Figure 4F:
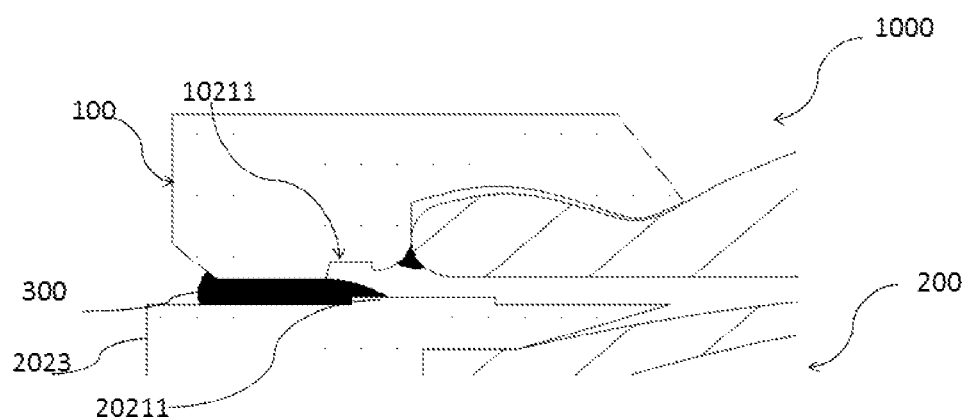
FIG. 4F shows a schematic partial cross-section view of the optical lenses according to an embodiment of the present application.

FIG. 4F shows a schematic partial cross-section view of the optical lenses 1000 according to an embodiment of the present application. As shown in FIG. 4F, the third adhesive blocking portion 20211 is a boss, and the first adhesive material 300 is not in contact with the second outer side surface 2023 of the second lens barrel 200, and is in contact with the third adhesive blocking portion 20111 at the same time.

Figure 4G:
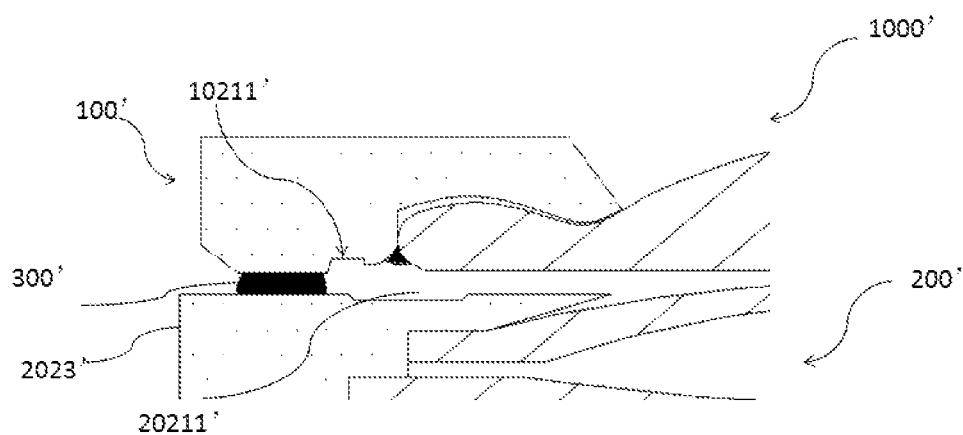
FIG. 4G shows a schematic partial cross-section view of the optical lenses according to an embodiment of the present application.

FIG. 4G shows a schematic partial cross-section view of the optical lenses 1000' according to an embodiment of the present application. As shown in FIG. 4G, the third adhesive blocking portion 20211' is a groove, and the first adhesive material 300' is not in contact with the second outer side surface 2023' of the second lens barrel 200', and is not in contact with the third adhesive blocking portion 20211' at the same time.

Figure 4H:
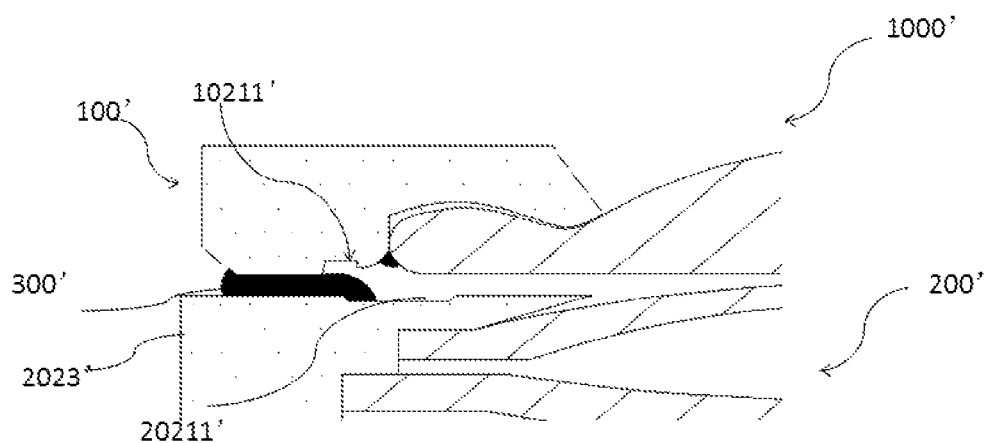
FIG. 4H shows a schematic partial cross-section view of the optical lenses according to an embodiment of the present application.

FIG. 4H shows a schematic partial cross-section view of the optical lenses 1000' according to an embodiment of the present application. As shown in FIG. 4H, the third adhesive blocking portion 20211' is a groove, and the first adhesive material 300' is not in contact with the second outer side surface 2023' of the second lens barrel 200', and is in contact with the third adhesive blocking portion 20211' at the same time.

In another example of the present application, also provided is a camera module based on the above optical lenses. The camera module includes an optical lenses and a photosensitive assembly, wherein the optical lenses may be an optical lenses in any of the foregoing examples.

According to an embodiment of the present application, also provided is a method for assembling an optical lenses, which includes:

Pre-positioning step: the separated first lenses part 100 and second lenses part 200 are pre-positioned, wherein the first lenses part 100 includes a first lens barrel 102 and at least one first lens 101 mounted in the first lens barrel 102, and the second lenses part 200 includes a second lens barrel 202 and at least one second lens 201 mounted in the second lens barrel 202, and the pre-positioning step makes the at least one first lens 101 and the at least one second lens 201 together constitute an imaging optical system.

Active calibration step: the active calibration is performed according to a measured imaging result of the optical system, thereby determining relative positions of the first lenses part 100 and the second lenses part 200.

Bonding step: the first lenses part 100 and the second lenses part 200 are bonded together to support and fix the relative positions of the first lenses part 100 and the second lenses part 200.

Wherein, the first lens barrel 102 has a first bottom surface 1021, and the second lens barrel 202 has a second top surface 2021, and an adhesive applying area for arranging the first adhesive material 300 is provided on the first bottom surface 1021 and/or the second top surface 2021; and wherein, at least one first lens 101 has an optical region 1011, and at least one second lens 201 also has an optical region 2011, and a first adhesive blocking portion 10211 is provided on the first bottom surface 1021, and the first adhesive blocking portion 10211 is located between the adhesive applying area and the optical region 1011 of the at least one first lens 101; and/or a third adhesive blocking portion 20211 is provided on the second top surface 2021, and the third adhesive blocking portion 20211 is located between the adhesive applying area and the optical region 2011 of the at least one second lens 201.

In one example, the active calibration step includes: arranging the first adhesive material 300 in the adhesive applying area; and performing the active calibration according to the measured imaging result of the optical system, so as to determine the relative positions of the first lenses part 100 and the second lenses part 200.

In one example, the adhesive applying area is located on the first bottom surface 1021, and arranging the first adhesive material 300 includes: arranging the first adhesive material 300 on the adhesive applying area on the first bottom surface 1021.

In one example, the adhesive applying area is located on the second top surface 2021, and arranging the first adhesive material 300 includes: arranging the first adhesive material 300 on the adhesive applying area on the second top surface 2021.

In one example, the active calibration step includes: performing the active calibration according to the measured imaging result of the optical system, so as to determine the relative positions of the first lenses part and the second lenses part; moving the first lenses part 100 or the second lenses part 200 away; arranging the first adhesive material 300 in the adhesive applying area; and moving the first lenses part 100 or the second lenses part 200 back to the relative positions determined by the active calibration.

In one example, the adhesive applying area is located on the first bottom surface 1021, and arranging the first adhesive material 300 includes: arranging the first adhesive material 300 on the adhesive applying area on the first bottom surface 1021.

In one example, the adhesive applying area is located on the second top surface 2021, and arranging the first adhesive material 300 includes: arranging the first adhesive material 300 on the adhesive applying area on the second top surface.

Figure 5A:
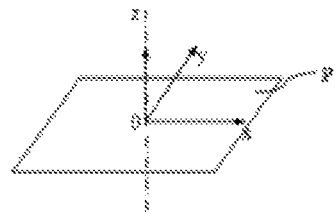
FIG. 5A shows an adjustment manner of relative positions during an active calibration in one example of the present application.

Further, the active calibration in this application may adjust the relative positions of the first lenses part 100 and the second lenses part 200 at multiple degrees of freedom. The active calibration refers to controlling adjustment of one lenses part relative to another lenses part to calibrate the entire optical system according to the measured resolution of the optical system, so that the axis of each lenses part is adjusted uniformly, and the measured resolution of the optical system reaches the standard. FIG. 5A shows an adjustment manner for relative positions in an active calibration according to an embodiment of the present application. In this adjustment manner, the first lenses part 100 may move along x, y, and z directions relative to the second lenses part 200 (i.e., the relative position adjustment in this embodiment has three degrees of freedom). Wherein z direction is a direction along the optical axis, and x and y directions are the directions perpendicular to the optical axis. The x and y directions are both in an adjustment plane P, and a translation in the adjustment plane P may be decomposed into two components in x and y directions.

Figure 5B:
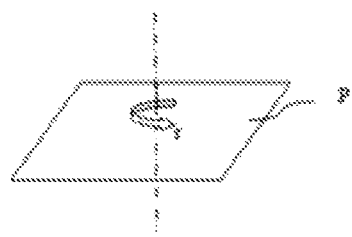
FIG. 5B shows a rotation adjustment during the active calibration in another example of the present application.

FIG. 5B shows a rotation adjustment in an active calibration of another embodiment according to the present application. In this embodiment, in addition to the three degrees of freedom in FIG. 5A, the degree of freedom in rotation is also added in the adjustment of the relative positions, i.e., the adjustment in r direction. In this embodiment, the adjustment in the r direction is a rotation in the adjustment plane P, i.e., a rotation around an axis perpendicular to the adjustment plane P.

Figure 5C:
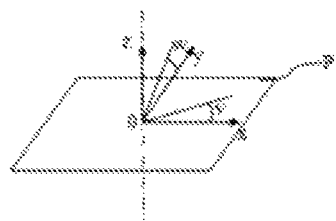
FIG. 5C shows an adjustment manner of relative positions during the active calibration in another example of the present application, in which adjustments in v and w directions are added.

Further, FIG. 5C shows an adjustment manner for relative positions in an active calibration according to another embodiment of the present application, in which adjustments in v and w directions are added. Herein, the v direction represents a rotation angle of xoz plane, and the w direction represents a rotation angle of yoz plane; and the rotation angles of the v and w directions may be combined into a vector angle, which represents a total inclination state. In other words, by adjusting the v and w directions, an inclination posture of the first lenses part 100 relative to the second lenses part 200 (i.e., an inclination posture of the optical axis of the first lenses part 100 relative to the optical axis of the second lenses part 200) may be adjusted.

The adjustment of the six degrees of freedom in x, y, z, r, v, and w directions may affect the imaging quality of the optical system (for example, affecting the resolution). In other embodiments of the present application, the adjustment manner of a relative position may be the adjustment at only any one of the above six degrees of freedom, or a combination of any two or more of them.

Further, in one embodiment, in the active calibration step, the movement further includes the translation on the adjustment plane P, i.e., the movement in x and y directions.

Further, in one embodiment, the active calibration further includes: adjusting and determining an included angle between the axis of the first lenses part 100 and the axis of the second lenses part 200 according to the measured resolution of the optical system, i.e., the adjustment in the w and v directions. And in the assembled optical lenses or camera module, the included angle between the axis of the first lenses part 100 and the axis of the second lenses part 200 may be non-zero.

Further, in one embodiment, the active calibration further includes: moving the first lenses part 100 in a direction perpendicular to the adjustment plane (i.e., the adjustment in z direction), and determining the relative positions of the first lenses part 100 and the second lenses part 200 in the direction perpendicular to the adjustment plane P, according to the measured resolution of the optical system.

Further, in one embodiment, in the pre-positioning step, a gap is provided between the bottom surface of the first lenses part 100 and the top surface of the second lenses part 200.

In one embodiment, in the active calibration step, the second lenses part 200 may be fixed, the first lenses part 100 may be clamped by a clamp, and the first lenses part 100 may be moved under the driving of the six-axis motion mechanism connected with the clamp, thereby realizing the relative movement between the first lenses part 100 and the second lenses part 200 at the above six degrees of freedom; wherein the clamp may be leaned against or partially leaned against the side surface of the first lenses part 100, so as to clamp the first lenses part 100.

In one embodiment, in the active calibration step, the first lenses part 100 may be fixed, the second lenses part 200 may be clamped by a clamp, and the second lenses part 200 may be moved under the drive of the six-axis motion mechanism connected with the clamp, thereby realizing the relative movement between the first lenses part 100 and the second lenses part 200 at the above six degrees of freedom; wherein the clamp may be leaned against or partially leaned against the side surface of the second lenses part 200, so as to clamp the second lenses part 200.

In the above embodiment, as an example, the optical lenses is described as including the first lenses part 100 and the second lenses part 200. However, the number of lenses parts in an optical lenses is not particularly limited, i.e., the number of lenses parts is not limited to two, and the number of lenses parts may be three, four or more according to the requirement of a specific design.

In the above embodiment, as an example, the number of lens of the first lenses part 100 is one, and the number of lens of the second lenses part 200 is five. However, the number of lens in the first lenses part 100 and the second lenses part 200 is not particularly limited, i.e., the number of lens in the lenses part is not limited to a specific number, and the number of lens in the lenses part may be one or more according to the requirement of a specific design.

The above description is only preferred embodiments of the present application and an explanation of the applied technical principles. Those skilled in the art should understand that, the scope of the invention involved in this application is not limited to the technical solutions formed by the specific combinations of the above technical features, and should also cover other technical solutions formed by any combination of the above technical features or the equivalent features without departing from the inventive concept. For example, the technical solutions formed by exchanging with each other between the above features and the technical features with functions similar to the features disclosed in this application (but not limited to them).

The invention claimed is:

1. Optical lenses comprising:
a first lenses part including at least one first lens;
a second lenses part including at least one second lens, wherein the at least one second lens together with the at least one first lens constitute an imaging optical system; and
a first adhesive material located in a first gap between the first lenses part and the second lenses part, and adapted for supporting and fixing the first lenses part and the second lenses part after being cured;
wherein, the first lenses part has a first bottom surface, and the second lenses part has a second top surface, and an adhesive applying area for arranging the first adhesive material is provided on the first bottom surface or the second top surface;
a first adhesive blocking portion is provided on the first bottom surface, or a third adhesive blocking portion is provided on the second top surface; and
the first adhesive blocking portion is a groove or a boss, and the third adhesive blocking portion is a groove or a boss, and in case that the first adhesive blocking portion is a groove, the width of the first adhesive blocking portion is 0.01-0.3 mm, and the depth of the first adhesive blocking portion is 0.02-0.1 mm.

2. The optical lenses according to claim 1, wherein the first lenses part further includes a first lens barrel, and the at least one first lens is mounted in the first lens barrel, and the second lenses part also includes a second lens barrel, and the at least one second lens is mounted in the second lens barrel;
wherein, the first lens barrel has the first bottom surface, and the second lens barrel has the second top surface, and the adhesive applying area for arranging the first adhesive material is provided on the first bottom surface or the second top surface; and the at least one first lens has a first optical region, and the at least one second lens has a second optical region, and the first adhesive blocking portion is located between the adhesive applying area and the first optical region; or the third adhesive blocking portion is located between the adhesive applying area and the second optical region.

3. The optical lenses according to claim 1, wherein the at least one first lens includes a first optical region and a first non-optical region, and the first non-optical region is arranged outside the first optical region, and the second lenses part further includes a second lens barrel, and the at least one second lens is mounted inside the second lens barrel;
wherein the first non-optical region has the first bottom surface, and the second lens barrel has the second top surface, and the adhesive applying area for arranging the first adhesive material is provided on the first bottom surface or the second top surface; and
the at least one second lens has a second optical region, and the first adhesive blocking portion is located between the adhesive applying area and the first optical region; or the third adhesive blocking portion is located between the adhesive applying area and the second optical region.

4. The optical lenses according to claim 2, wherein the at least one first lens has an outer side surface, and the first lens barrel has a first inner side surface;
wherein the outer side surface of the at least one first lens and the first inner side surface of the first lens barrel are connected by a second adhesive material.

5. The optical lenses according to claim 4, wherein the at least one first lens is more than one and has a first bottom surface, and the outer side surface of the lens near the first bottom surface of the at least one first lens is connected with the first inner side surface by the second adhesive material.

6. The optical lenses according to claim 1 wherein in the case that the first adhesive blocking portion is a boss, the width of the first adhesive blocking portion is 0.01-0.3 mm, and the height of the first adhesive blocking portion is 0.02-0.1 mm.

7. The optical lenses according to claim 1 wherein the third adhesive blocking portion is a groove, and the width of the third adhesive blocking portion is 0.2-1 mm, and the depth of the third adhesive blocking portion is 0.02-0.085 mm.

8. The optical lenses according to claim 1 wherein the third adhesive blocking portion is a boss, and the width of the third adhesive blocking portion is 0.2-1 mm, and the height of the third adhesive blocking portion is 0.02-0.085 mm.

9. The optical lenses according to claim 2, wherein after being cured, the width of the first adhesive material is 0.15-1 mm, and the height of the first adhesive material is 0.04-0.1 mm.

10. The optical lenses according to claim 2, wherein the first adhesive blocking portion is located between the adhesive applying area and the first optical region, and the first adhesive blocking portion includes a distal end away from the at least one first lens, and the first lens barrel has a first outer side surface, and the distance between the distal end of the first adhesive blocking portion and the first outer side surface is greater than or equal to 0.35 mm.

11. The optical lenses according to claim 2, wherein the third adhesive blocking portion is located between the adhesive applying area and the second optical region, and the third adhesive blocking portion includes a distal end away from the at least one second lens, and the second lens barrel has a second outer side surface, and the distance between the distal end of the third adhesive blocking portion and the second outer side surface is greater than or equal to 0.45 mm.

12. The optical lenses according to claim 2, wherein the first lens barrel has a first outer side surface, and a second adhesive blocking portion is provided between the first outer side surface and the adhesive applying area, and the second adhesive blocking portion is located on the first bottom surface.

13. The optical lenses according to claim 2, wherein the first adhesive material is distributed on the first bottom surface or the second top surface in a ring shape, or the first adhesive blocking portion is distributed on the first bottom surface in a ring shape, or the third adhesive blocking portion is distributed on the second top surface in a ring shape.

14. The optical lenses according to claim 2, wherein the second lens barrel has a second outer side surface, and the first adhesive material is in contact with the second outer side surface of the second lens barrel and is not in contact with the third adhesive blocking portion, or the first adhesive material is in contact with the second outer side surface of the second lens barrel and is in contact with the third adhesive blocking portion, or the first adhesive material is not in contact with the second outer side surface of the second lens barrel and is not in contact with the third adhesive blocking portion.

15. The optical lenses according to claim 2, wherein a first adhesive blocking portion is provided on the first bottom surface, and the first adhesive blocking portion is located between the adhesive applying area and the first optical region, and a third adhesive blocking portion is provided on the second top surface, and the third adhesive blocking portion is located between the adhesive applying area and the second optical region;
wherein the first adhesive blocking portion includes a proximal end adjacent to the at least one first lens and a distal end away from the at least one first lens, and the third adhesive blocking portion includes a proximal end adjacent to the at least one second lens and a distal end away from the at least one second lens; and
the distal end of the third adhesive blocking portion is located between the proximal end and the distal end of the first adhesive blocking portion.

16. A camera module including the optical lenses of claim 1.

17. A method for assembling optical lenses, comprising:
assembling separated first lenses part and second lenses part together to form a complete optical system; and
connecting the first lenses part with the second lenses part by a first adhesive material; wherein the first lenses part has a first bottom surface, and the second lenses part has a second top surface, and
a first adhesive blocking portion is provided on the first bottom surface, or a third adhesive blocking portion is provided on the second top surface; and
the first adhesive blocking portion is a groove or a boss, and the third adhesive blocking portion is a groove or a boss, and in case that the first adhesive blocking portion is a groove, the width of the first adhesive blocking portion is 0.01-0.3 mm, and the depth of the first adhesive blocking portion is 0.02-0.1 mm.

* * * * *